US008688535B2

(12) United States Patent
Yuan (10) Patent No.: US 8,688,535 B2
(45) Date of Patent: Apr. 1, 2014

(54) USING MODEL INFORMATION GROUPS IN SEARCHING

(75) Inventor: Wei Yuan, Hangzhou (CN)

(73) Assignee: Alibaba Group Holding Limited (KY)

( * ) Notice: Subject to any disclaimer, the term of this patent is extended or adjusted under 35 U.S.C. 154(b) by 176 days.

(21) Appl. No.: 13/068,656

(22) Filed: May 16, 2011

(65) Prior Publication Data

US 2011/0288956 A1 Nov. 24, 2011

(30) Foreign Application Priority Data

May 18, 2010 (CN) .......................... 2010 1 0176800

(51) Int. Cl.
*G06Q 30/00* (2012.01)

(52) U.S. Cl.
USPC ....................................... 705/26.1

(58) Field of Classification Search
USPC ....................................... 705/26.1
See application file for complete search history.

(56) References Cited

U.S. PATENT DOCUMENTS

| 7,127,416 | B1 | 10/2006 | Tenorio |
| 2002/0062258 | A1 | 5/2002 | Bailey et al. |
| 2003/0009392 | A1 | 1/2003 | Perkowski |
| 2004/0088221 | A1 | 5/2004 | Katz et al. |
| 2006/0026147 | A1 | 2/2006 | Cone et al. |
| 2006/0224406 | A1 | 10/2006 | Leon et al. |
| 2007/0022021 | A1 | 1/2007 | Walker et al. |
| 2007/0038615 | A1* | 2/2007 | Vadon et al. ...................... 707/4 |
| 2007/0043651 | A1 | 2/2007 | Xiao et al. |
| 2007/0100650 | A1 | 5/2007 | Ramer et al. |
| 2009/0106108 | A1* | 4/2009 | Ku .................................. 705/14 |
| 2009/0119261 | A1 | 5/2009 | Ismalon |
| 2010/0106618 | A1 | 4/2010 | Su |
| 2012/0143840 | A1* | 6/2012 | Vadon et al. .................. 707/706 |

* cited by examiner

*Primary Examiner* — Mila Airapetian
(74) *Attorney, Agent, or Firm* — Van Pelt, Yi & James LLP (57) ABSTRACT

Managing user accesses is disclosed, including: generating journal files over a predetermined period of time, wherein a journal file includes merchandise information associated with an accessed webpage; determining, for a merchandise category, information related to an attribute based at least in part on the generated journal files; aggregating information associated with the attribute from journal files associated with the merchandise category, wherein the aggregated information is to be included in a model information group associated with the merchandise category; and returning, in a subsequent search of merchandise information corresponding to the merchandise category, search results that are based at least in part on information associated with the model information group. Conducting searches of merchandise information is disclosed, including: determining a merchandise category associated with a query based at least in part on received keywords associated with the query; retrieving a model information group corresponding to the determined merchandise category; extracting attribute information from the retrieved model information group based at least in part on a quantity associated with an attribute; and presenting the extracted attribute information.

17 Claims, 5 Drawing Sheets

USING MODEL INFORMATION GROUPS IN SEARCHING

CROSS REFERENCE TO OTHER APPLICATIONS

This application claims priority to People's Republic of China Patent Application No. 201010176800.0 entitled METHOD FOR RECORDING USER ACCESSING OF MERCHANDISE INFORMATION AND METHOD AND SERVER FOR SEARCHING filed May 18, 2010 which is incorporated herein by reference for all purposes.

FIELD OF THE INVENTION

The present application relates to the field of computer technology, and in particular relates to searches and retrieval of merchandise information.

BACKGROUND OF THE INVENTION

Typically, when users conduct merchandise searches on websites involving enterprise to individual user (e.g., Business To Customer, B2C) or individual user to individual user (e.g., Customer To Customer, C2C), they input the names of merchandise to be queried via interfaces provided by the websites. The search results that the websites return to users mainly include one or both of two types; one being navigation information associated with the queried merchandise and the other being information associated with the queried merchandise.

Conventionally, large amounts of merchandise information are organized together in a tree structure in accordance with the categories of the merchandise. Sometimes, the merchandise categories are stored in data tables corresponding to databases, with artificial input and maintenance of data for each of the nodes in the merchandise category tree, the display of each piece of the merchandise information in B2C websites or C2C websites belonging to one or more nodes in the merchandise category tree.

When users query for merchandise information at B2C websites or C2C websites, if the results returned to the user by the website include navigation information (e.g., information that helps a user traverse the merchandise category tree) associated with the queried merchandise, then the user can locate the desired query search results from top to bottom along the route of the merchandise category tree, based on the received navigation information. If the results returned to the user by the website include information associated with the merchandise, then the website will return to the user information on all of the nodes in the merchandise category tree that are associated with the queried merchandise.

The inventory of merchandise on current electronic commerce websites can be enormous; the quantities of merchandise at some websites may reach a scale of a hundred million. The volume of merchandise information returned for a query of a piece of merchandise can be great, and difficult for the user to process. Also, the enormous amount of merchandise information that a website server sends to the querying user may take up a large amount of the server's system resources and network bandwidth. Furthermore, it may be difficult to accurately and quickly locate the merchandise that the user had intended to query for at the website.

A conventional way to resolve the above-described problems is to limit the number of merchandise categories returned to the user and reduce the amount of merchandise information that is returned to the user. By limiting the amount of merchandise information returned to a user, the resources utilized by a website's server in sending merchandise information can be reduced. Also, the time that it takes to return information based on a query can also be reduced. However, limiting the amount of merchandise information returned also runs the risk of eliminating merchandise information that is very relevant to a user's query.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Recording user accesses and using the records to assist in searches is disclosed. In some embodiments, journal files are generated based on user accesses of webpages. In some embodiments, merchandise categories associated with the generated journal files are determined. In some embodiments, attribute information is determined for a merchandise category based on the journal files. In some embodiments, the attribute information of a merchandise category is included in a model information group to be stored for the merchandise category. In some embodiments, the model information groups are referred to in conducting searches of merchandise information.

Figure 1:
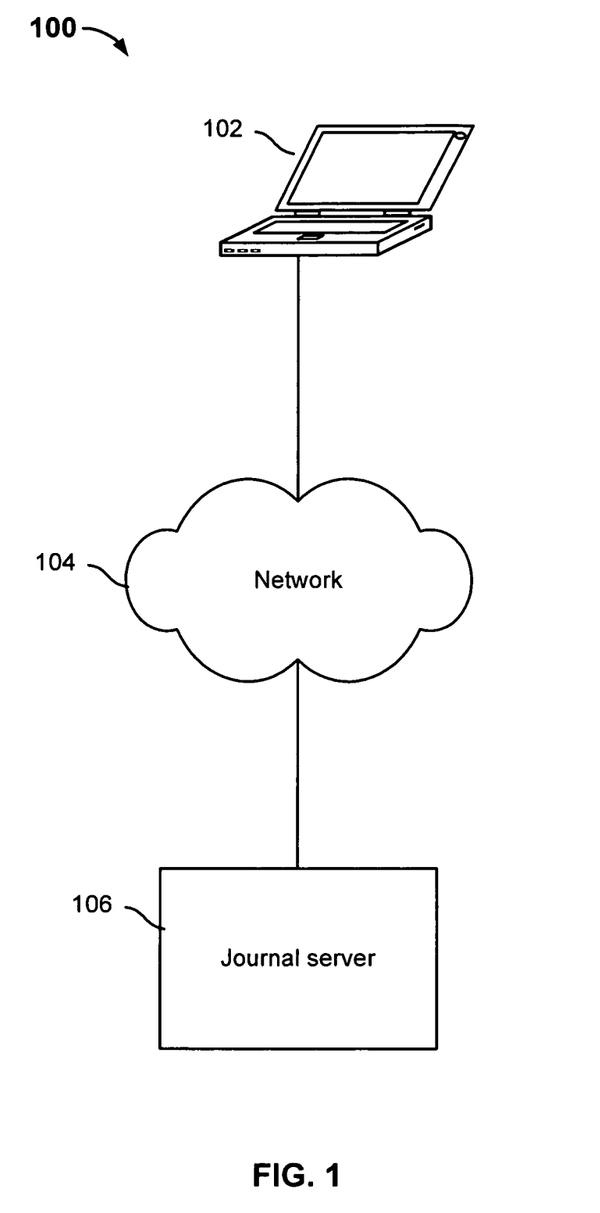
FIG. 1 is a diagram showing an embodiment of a system for recording user accesses and using recorded user accesses.

FIG. 1 is a diagram showing an embodiment of a system for recording user accesses and using recorded user accesses. Device 102 communicates with journal server 106 via network 104. Network 104 includes various high speed data networks and/or telecommunications networks.

While device 102 is shown to be a laptop, device 102 may include any type of computer, handheld device, mobile device, mobile phone or tablet. Device 102 is configured to access an electronic commerce website. In some embodiments, device 102 permits a website to be accessed via a web browser. In some embodiments, device 102 is configured to browse various webpages of the website under the control of a user (e.g., who intends to peruse the website). In some embodiments, device 102 sends the information associated with the accessed webpages to journal server 106 for the server to generate corresponding journal files.

In some embodiments, device 102 is configured to receive a query input by a user at a web-based user interface (e.g., supported by or otherwise associated with journal server 106). In some embodiments, device 102 sends the received query input to journal server 106 to receive search results based on the query.

In various embodiments, journal server 106 is associated with an electronic commerce website. Journal server 106 is configured to record user accesses. In some embodiments, journal server 106 receives information regarding which webpages of the electronic commerce website that one or more users have accessed (e.g., browsed) from device 102. Journal server 106 generates a journal file based on the merchandise information displayed and/or otherwise presented at an accessed webpage, each time the webpage is accessed. In some embodiments, a journal file includes a page that displays information on at least one attribute of the merchandise information. In some embodiments, a journal file also includes a keyword associated with a query for which the accessed webpage was returned as a search result. In some embodiments, journal server 106 determines one or more merchandise categories for a set of journal files that were generated during a predetermined period of time. In some embodiments, journal server 106 uses the set of journal files to determine at least one piece of attribute information for each of the determined categories. In some embodiments, journal server 106 is configured to store the attribute information (e.g., including the types of an attribute and their corresponding quantities) for a merchandise category as a model information group for that merchandise category. In some embodiments, a model information group corresponds to a merchandise category and represents the user's intentions in accessing merchandise information during the predetermined period of time during which the journal files were generated. In some embodiments, for a search query, one or more merchandise categories that can be determined based on the search query and the model information groups of those merchandise categories can be retrieved. Then, attribute information extracted from the retrieved model information groups can be presented to the user (e.g., in a webpage or links to a webpage) as at least part of the search results.

Journal server 106 is also configured to use recorded user accesses. In some embodiments, journal server 106 is configured to support a web-based user interface associated with the electronic commerce website. In some embodiments, journal server 106 receives a query input by a user (e.g., at an electronic commerce website) from device 102. In some embodiments, journal server 106 determines a merchandise category that is associated with the query based on one or more keywords included in the query. Once a merchandise category is determined, in some embodiments, journal server 106 retrieves a stored model information group associated with the determined merchandise category. In some embodiments, journal server 106 is configured to identify attribute information of the retrieved model information group that matches a keyword of the query. In some embodiments, keywords of the query that do not match any attribute information of the retrieved model information are eliminated and the remaining keywords are used to perform a new search and/or are included in a newly generated journal file. In some embodiments, the remaining keywords can be added to the retrieved model information group. In some embodiments, journal server 106 extracts attribute information from the retrieved model information group based on the quantities corresponding to the attribute information. In some embodiments, journal server 106 presents the extracted information in a display (e.g., a user interface) to the user who inputted the query. In some embodiments, if a merchandise category cannot be determined for a query based on its keywords, then the keywords can be matched against attribute information of various model information groups.

Figure 2:
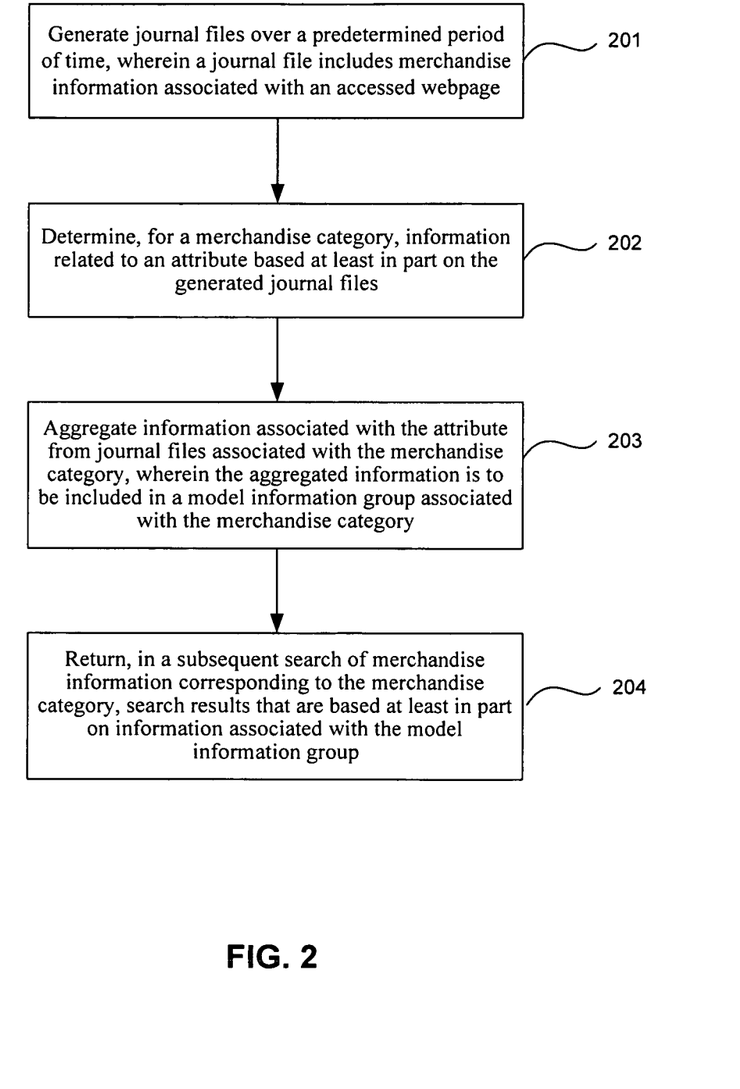
FIG. 2 is a flow diagram showing an embodiment of recording user accesses.

FIG. 2 is a flow diagram showing an embodiment of recording user accesses. In some embodiments, process 200 is used to record user accesses at an electronic commerce website. In some embodiments, process 200 can be implemented on system 100.

At 201, journal files are generated over a predetermined period of time, wherein a journal file includes merchandise information associated with an accessed webpage.

In some embodiments, a journal server is configured to generate journal files over a predetermined period of time (e.g., as set by an administrator of the server).

In some embodiments, a journal file is generated each time a user clicks on a webpage associated with an electronic commerce website. In some embodiments, the journal file that is generated is stored at the journal server or at a separate location (e.g., database) that is accessible by the journal server.

In some embodiments, a journal file includes a page that displays information on at least one attribute of the merchandise information. Examples of an attribute of the merchandise information include merchandise brand information, merchandise manufacturer information, merchandise availability information, merchandise model number information, merchandise color information and/or category ID information to which the merchandise belongs. For example, when a user accesses an electronic commerce website where the merchandise that is offered is cell phones, the journal file generated (e.g., by the server supporting the website) can include the following attribute information: "ABC" as the cell phone brand information, "123" as the cell phone model number information, "red" as the cell phone color information, and "cell phone" as the category ID information to which it belongs.

In some embodiments, the journal file is a text file automatically generated by the journal server when the user clicks on a merchandise category page or merchandise information page. In some embodiments, the formats of the information included in each of the journal files stored on the journal server may not be uniform (e.g., because the characters or text inputted by users may vary in language or syntax). In some embodiments, in the event that the formats of the information of journal files are not uniform for a journal server, then a normalization process can be carried out for the contents within the journal files. Examples of a normalization process includes, but is not limited to: removal of unnecessary words, removal of superfluous spaces, conversion of the size of written letters, full angle and half angle conversion, conversion from traditional characters to simplified characters, conversion of punctuation, conversion of Chinese numerals to alphanumeric characters, and translation from one language to another language.

In some embodiments, if a user accesses a page using the navigation information provided by the search engine of the electronic commerce website, then the journal file can also include search keyword information provided to the search engine by the user. For example, when the user searches for the keywords "ABC red", the webpage accessed based on the navigation information returned by the search engine provides cell phones with the brand of "ABC", model number of "123" and color of "red." Then the journal file that is generated for this instance of user access can include the following attribute information: "ABC" as the cell phone brand information, "123" as the cell phone model number information, "red" as the cell phone color information, and "ABC red" as the search keyword information.

At 202: for a category of merchandise, information related to an attribute based at least in part on the generated journal files is determined.

In some embodiments, statistical analysis can be regularly performed using the journal files generated during a set period of time (e.g., 24 hours) to determine the query intentions or interest in certain merchandise information of users for merchandise information during this period of time. In some embodiments, the journal files generated during a set period of time can be journal files that are generated when a plurality of users access the website that provides the merchandise information. In some embodiments, the journal files generated during the set period of time may include information related to one or more categories of merchandise. In some embodiments, each journal file can include information related to one or more merchandise categories.

In some embodiments, the different categories associated with the generated journal files are identified. For example, a set of generated journal files can include information for different merchandise categories, such as cell phones and women's skirts. In some embodiments, the attributes for each category of merchandise can be determined. In some embodiments, all categories of merchandise include the same attributes (e.g., brand, model, and color).

In some embodiments, the generated journal files are classified or sorted by merchandise category and then by attribute information (e.g., for each determined merchandise category) via a support vector machine for generating category data. In some embodiments, a support vector machine is a supervised learning method in which a set of input data is used. The machine can predict, for each given input, which class that input is a member of Put another way, in some embodiments, the support vector machine can be used to help classify journal files into one or more merchandise categories.

At 203: information associated with the attribute is aggregated from journal files associated with the merchandise category, wherein the aggregated information is to be included in a model information group associated with the merchandise category.

In some embodiments, a merchandise category is associated with one or more attributes. In some embodiments, information for an attribute of a merchandise category includes the number of times that information associated with that attribute appears among the analyzed journal files. The number of times that information associated with an attribute appears is then included in the model information group associated with the category of merchandise. In some embodiments, aggregated information for one or more attributes associated with a category of merchandise is referred to as the attribute model information. In some embodiments, attribute model information for a merchandise category includes one or more of the following: merchandise brand model information, merchandise model number model information and merchandise color model information, etc. For example, the journal files associated with a merchandise category (e.g., cell phone) includes attributes such as brand information, model number information, color information and category information. Then the aggregated information for the attribute of brand in the model information group information associated with the merchandise category of cell phone would include an identifier associated with each type of brand information (e.g., Google™ brand cell phones, Apple® brand cell phones) and the number of times that each brand information appears (e.g., the Google™ brand has appeared 65 times, and the Apple® brand has appeared 230 times). Similarly, the aggregated information for the attribute of model number information includes an identifier associated with each of type of model information (e.g., the Google™ brand's Android™ cell phones, the Apple® brand's iPhone® 4 cell phones) and the number of times that each model information appears (e.g., the Google™ brand's Android™ cell phones has appeared 59 times, the Apple® brand's iPhone® 4 cell phones has appeared 289 times). Also, the aggregated information for the color model information includes an identifier associated with each type of color information (e.g., white cell phones and black cell phones) and the number of times it appears (e.g., white has appeared 210 times, and black has appeared 402 times).

In some embodiments, each journal file is generated when the user accesses a webpage that provides certain merchandise information so one piece of merchandise information can correspond to each journal file. In some embodiments, however, the content of information on one or multiple attributes of some merchandise information may be identical or very similar, but the attributes are associated with different categories. For example, attributes associated with the different categories of cell phones and computers may be the same (e.g., because the brand of Apple® is associated with both cell phone and computer merchandise). In some embodiments, attribute information is aggregated for each category of merchandise. For example, each journal file can be associated with a category of merchandise and the attribute information included within that journal file is aggregated and included in the model information group associated with that category of the journal file. The following is an example illustrating the processing of journal files generated during a set period of time. In this example, N journal files were generated during a predetermined period of time.

Analysis is performed in sequence for N journal files (1, 2, n0, n1, n2, n3 . . . . N) to determine the attribute information included in each journal file used to add and/or update the model information groups that correspond to two merchandise categories. In this example, journal files 1 through n0 represent journal files generated over a predetermined period of time to illustrate model information groups populated from the information collected during this time. Journal files n1, n2, and n3 are mentioned individually, in this example, to illustrate the updates to an existing model information group made in response to each newly generated journal file.

Initially, analysis is performed using journal files 1 through n0. The results of the analysis are presented in the following table, Table 1:

TABLE 1

| Model Information Group: Category | Merchandise Brand Model Information Brand identifier: Quantity | Merchandise Model Number Model Information Model identifier: Quantity | Merchandise Color Model Information Color identifier: Quantity |
|---|---|---|---|
| Model information group 1: cell phone | ABC: 2<br>DEF: 8 | 123: 6<br>456: 20 | Red: 10<br>Black: 60 |
| Model information group 2: woman's skirt | qwe: 10<br>jkl: 6 | S: 30<br>M: 35 | White: 45<br>Green: 50 |

In this example, assume that journal file n1 is the journal file that is generated when a user accesses a webpage that provides information on a particular cell phone. Thus, the attribute information included within journal file n1 includes "Merchandise Brand Information: ABC", "Merchandise Model Number Information: 123" and "Merchandise Color Information: Red".

In this example, journal file n2 is the journal file that is generated when a user accesses the webpage that provides information on another cell phone. The attribute information included within journal file n2 includes: "Merchandise Brand Information: DEF", "Merchandise Model Number Information: 456" and "Merchandise Color Information: Red".

In this example, journal file n3 is the journal file that is generated when a user accesses the webpage that provides information on women's skirts. The attribute information included within journal file n3 includes: "Merchandise Brand Information: qwe", "Merchandise Model Number Information: S" and "Merchandise Color Information: White".

Next, in this example, journal files n1, n2, and n3 are analyzed, aggregated, and added to results from the previous analysis of journal files 1, 2 . . . n0. The updated model information groups table are in the following table, Table 2:

TABLE 2

| Model Information Group: Category | Merchandise Brand Model information Brand identifier: Quantity | Merchandise Model Number Model Information Model identifier: Quantity | Merchandise Color Model Information Color identifier: Quantity |
|---|---|---|---|
| Model information group 1: cell phone | ABC: 3<br>DEF: 9 | 123: 7<br>456: 21 | Red: 12<br>Black: 60 |
| Model information group 2: woman's skirts | qwe: 11<br>yui: 6 | S: 31<br>M: 35 | White: 46<br>Green: 50 |

The combination of the multiple model information groups shown in Table 2 can represent the model for user intentions in accessing a variety of categories of merchandise during the period of time over which journal files 1, 2, . . . n3 were generated. Similarly, subsequent to analysis of journal files n1, n2, and n3, journal files n4 through N can be analyzed and the results be used to update the information of Table 2.

In some embodiments, the relationship between each merchandise category and its model information group is also stored. For example, all the information in the columns corresponding to the category row of "Model information group 1: cell phone" will be stored with the category.

At 204, in a subsequent search of merchandise information corresponding to the merchandise category, search results that are based at least in part on information associated with the model information group are returned.

In some embodiments, in a subsequent search of merchandise information corresponding to the merchandise category, search results are based on least in part on information associated with the model information group. For example, for a search query, a corresponding merchandise category can be identified. Then the model information group corresponding to that merchandise category can be retrieved and the attribute information from the merchandise category can be extracted to be included in the search results.

Figure 3:
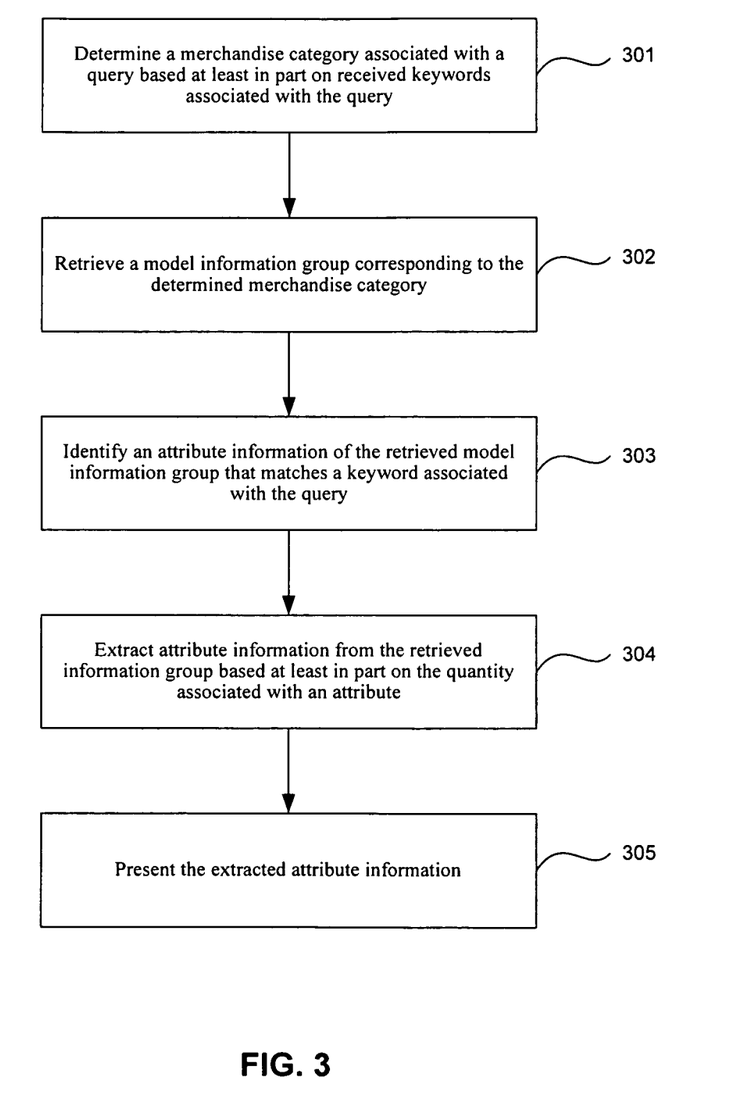
FIG. 3 is a flow diagram showing an embodiment of using recorded user accesses to conduct searches of merchandise information.

FIG. 3 is a flow diagram showing an embodiment of using recorded user accesses to conduct searches of merchandise information. In some embodiments, process 300 can be used to implement 204 of process 200.

At 301: a merchandise category associated with a query is determined based at least in part on received keywords associated with the query.

In some embodiments, the journal server also supports assisting in user searches of merchandise information using the journal files and/or the results of analyzing journal files (e.g., creating/updating model information groups). In some embodiments, a query that is inputted by a user (e.g., at a web-based user interface) at the electronic commerce website is received by the journal server. In some embodiments, the query is directed towards finding merchandise information about a particular category of merchandise (e.g., cell phone). In some embodiments, the query includes one or more keywords. In some embodiments, the merchandise category associated with the query is determined by comparing keywords of the query against stored relationships between keywords and merchandise categories. When a match is found between a keyword of the query and a keyword of a stored relationship, then the determined merchandise category is the one that corresponds to the matched keyword.

At 302: a model information group corresponding to the determined merchandise category is retrieved.

In various embodiments, a model information group is determined and stored for a merchandise category (e.g., using process 200). For example, the model information group corresponding to a certain merchandise category is stored with its category ID. So, the model information group corresponding to the determined merchandise category can be identified (e.g., using the appropriate category ID) and retrieved.

For example, a user inputs a query at an electronic commerce website including the keywords of "cell phone" and "DEF". Based on those keywords, it is determined that the merchandise category of the merchandise information that the user is seeking is cell phones, and the merchandise brand information is DEF. The merchandise category of "cell phone" corresponds to the row of model information group 1 of Table 2. In some embodiments, attribute information (e.g., in addition to a merchandise category) can also be determined from the keywords of the query.

At 303: attribute information of the retrieved model information group that matches a keyword associated with the query is identified.

Returning to the previous example, for retrieved model information group 1, the identified attribute model information of model information group 1 includes merchandise brand model information, merchandise model number model information and merchandise color model information. In some embodiments, attribute information of a model information group can include more or fewer types of information than merchandise brand model information, merchandise model number model information and merchandise color model information. The attribute information of model information group 1 that matches the query keyword "DEF" includes: the merchandise brand model information "DEF", merchandise model number model information "123, 456" and merchandise color model information: "red, black".

In some embodiments, if a keyword of the query matches stored attribute information of the retrieved model information group, then it indicates that this keyword of the query is a high-frequency word and that the query can be performed using the model information group (e.g., obtained using process 200).

In some embodiments, if a keyword of the query does not match stored attribute information of the retrieved model information group, then it indicates that this keyword of the query is low-frequency. In some embodiments, the keywords of the query that do not match to attribute information of the retrieved model information group are eliminated. In some embodiments, after one or more keywords of the query are eliminated, a search is performed using the remaining keywords of the query. For example, assume that the keywords of a user-input query include "cell phone" and "ABD." In this example, assume because there are no "ABD" brand cell phones in model information group 1 (i.e., there is no match of attribute information of model information group 1 to the keyword "ABD"), the keyword "ABD" is eliminated from the query keywords. Then, the remaining keyword of the query, "cell phone," will be used in a new search for determining the attribute information that is relevant to the original query.

In some embodiments, a low-frequency keyword of the query (e.g., a keyword of the query that does not match to attribute information of the retrieved model information group) is utilized to carry out real-time analysis of the user's query intentions. In some embodiments, in this scenario, the low-frequency keyword can be added to the content of the retrieved model information group (e.g., by adding an identifier associated with the keyword and also a quantity of 1). Returning to the previous example, because "ABD" was deemed to be a low-frequency keyword, it can be used to update Table 2 for model information group 1. The resulting table is shown below in Table 3:

TABLE 3

| Model Information Group: Category | Merchandise Brand Model Information Brand identifier: Quantity | Merchandise Model Number Model Information Model identifier: Quantity | Merchandise Color Model Information Color identifier: Quantity |
|---|---|---|---|
| Model information group 1: cell phone | ABC: 3 DEF: 9 ABD: 1 | 123: 7 456: 21 | Red: 12 Black: 60 |
| Model information group 2: woman's skirts | qwe: 11 yui: 6 | S: 31 M: 35 | White: 46 Green: 50 |

At 304: attribute information is extracted from the retrieved model information group based at least in part on the quantity associated with an attribute.

In some embodiments, attribute information is extracted from the retrieved model information group. In some embodiments, the extracted information includes the attribute information (e.g., or rather, identifiers of types thereof) with the greatest quantity. In some embodiments, there are multiple types for each piece of attribute information. For example, in Table 2, for model information group 1, under attribute information of "Merchandise Brand Model Information," there are two types of brands, "DEF" and "ABD" and their respective quantities, "9" and "3." In some embodiments, the extracted information includes the attribute information whose corresponding quantity exceeds a certain predetermined threshold.

For example, model information group 1 of Table 2 is determined for a query with keywords "cell phone" and "DEF." Then the attribute information retrieved from 304 includes: merchandise brand information "DEF", merchandise model number information "123" and "456," and merchandise color information "red" and "black". It can be determined from Table 2 that the merchandise brand information is "DEF" (e.g., since "DEF" was a keyword of the query that matches the attribute information of model information group 1), so regardless of what the quantity of "DEF" is, "DEF" is the extracted attribute information (e.g., as opposed to "ABC," which does not match a keyword of the query). Referring again to Table 2, the quantity of the merchandise model information of "123" is 7, and the quantity of the merchandise model number information of "456" is 21. Since of the quantity associated with model number "456" is greater than that which is associated with model number "123", "456" can serve as the extracted attribute information. Returning to Table 2, the quantity of the merchandise color information of "red" is 12 and the quantity of the merchandise color information of "black" is 60. Since there is a greater quantity of "black" than "red," "black" can serve as the extracted attribute information. Thus, the extracted attribute information includes: merchandise brand model information "DEF", merchandise model number model information "456" and merchandise color model information "black".

At 305: the extracted attribute information is presented.

In some embodiments, the extracted attribute information is retrieved from storage (e.g., where model information groups are stored). In some embodiments, the extracted attribute information is formatted and entered into a form that can be displayed at a user interface. In some embodiments, the extracted attribute information is put into hypertext markup language (HTML) and/or XML form and displayed at a webpage. In some embodiments, a link to a webpage that includes the extracted attribute information is displayed to the user.

In some embodiments, merchandise information is stored in a database in the form of a merchandise information category tree. As such, the extracted attribute information corresponds to nodes of the merchandise information category tree. Returning to the previous example, nodes of the tree that include the extracted attributes of the merchandise brand "DEF", the merchandise model number "456" and the merchandise color "black" can be returned (e.g., as content retrieved from the nodes or references to the nodes) to the user in accordance with an XML format. In some embodiments, other information besides the extracted attribute information can be returned from the category tree, such as merchandise price, name of the seller of the merchandise, and buyer feedback information, for example.

In some embodiments, in process 300, if a merchandise category cannot be determined from the keywords of a user-input query, then the keywords of the query can be matched against attribute information of various model information groups. If a match is found between one or more of the keywords and attribute information of a model information group, then that model information group can be used to determine the merchandise category to which the query is relevant. In some embodiments, if a match is found between one or more keywords and the attribute information of a model information group, then a new search can be performed based on the information returned for a search using the matching keywords. In some embodiments, when a search is performed for one or more keywords, then the database of merchandise information is searched for relevant information (e.g., the webpages to which are returned in the form of uniform resource locators (URLs). In some embodiments, when a user accesses the returned URLs, then journal files are generated and can be used to update model information groups.

For example, if the query keyword input by the user at 301 is "ABC", then it is determined (e.g., by finding a match between the query keyword and the attribute information of model information groups) that the merchandise category with which the query is associated is cell phones.

In another example, if the query keyword input by the user at 301 is "ABD", then the merchandise category with which the query is associated cannot be determined. In other words, a match cannot be found by finding a match between the query keyword and the attribute information of model information groups because no such match exists. Because the merchandise category cannot be determined for the query in this manner, then "ABD" is searched for among the stored merchandise category information (e.g., in a merchandise category tree stored in the database) and the relevant matches are returned (e.g., all the information of relevant nodes of the tree are returned to the user). For example, a match within the stored merchandise category information can be returned as URLs that point to webpages that include relevant information. So each time that the user accesses one such URL to access the associated webpage, then a journal file is generated (e.g., using process 200). For example, when the user accesses a webpage that provides the merchandise information of the ABD brand cell phones, then the journal file generated for this access can include the following attribute information: the cell phone brand information is "ABD." This information can then be added to Table 2 to update the table and to obtain Table 3, as shown below:

TABLE 3

| Model Information Group: Category | Merchandise Brand Model Information Brand identifier: Quantity | Merchandise Model Number Model Information Model identifier: Quantity | Merchandise Color Model Information Color identifier: Quantity |
|---|---|---|---|
| Model information group 1: cell phone | ABC: 3 DEF: 9 ABD: 1 | 123: 7 456: 21 | Red: 12 Black: 60 |
| Model information group 2: woman's skirts | qwe: 11 yui: 6 | S: 31 M: 35 | White: 46 Green: 50 |

As described above, the user-input query keyword "ABD" may be the content of the existing merchandise information (e.g., stored in a merchandise category tree) or it may also be an erroneous input by the user. For example, if the query keyword that the user actually wished to input was "ABC" but the user accidentally inputted "ABD," search results are returned for the user without first retrieving an associated model information group, assuming that it is determined that the keyword "ABD" is not associated with a particular merchandise category. The search results can include at least one URL to a webpage with merchandise attribute information (e.g., found within the merchandise category tree). When the user accesses such a webpage, then a corresponding journal file will be generated that includes the actual attribute information of that page and the user-input query keyword of "ABD." For example, the user may access a webpage including information regarding the ABC brand of cell phones. Thus, the journal file that is generated for this access can include at least the following attribute information: cell phone brand information of "ABC" and "ABD." So Table 2 can be updated based on the currently-generated journal file (e.g., during a subsequent process, such as process 200), to derive the model information groups as illustrated in Table 4:

TABLE 4

| Model Information Group: Category | Merchandise Brand Model Information Brand Information: Quantity | Merchandise Model Number Model Information Model Number Information: Quantity | Merchandise Color Model Information Color Information: Quantity |
|---|---|---|---|
| Model information group 1: cell phone | ABC: 4 DEF: 9 ABD: 1 | 123: 7 456: 21 | Red: 12 Black: 60 |
| Model information group 2: woman's skirt | qwe: 11 yui: 6 | S: 31 M: 35 | White: 46 Green: 50 |

Assuming that "ABD" is the user's erroneous input, then in the process of 300, Table 4 is referred to for extracting attribute information, because the quantity corresponding to the erroneous input "ABD" is relatively small as compared to the quantities of other brands, and the erroneous input will not greatly affect the accuracy of the query results. However, if "ABD" is not the user's erroneous input and is actually intended to represent a new type of cell phone brand, then later, when the user inputs a query including "ABD," accurate query results can be provided for the user based on an updated Table 4.

Figure 4:
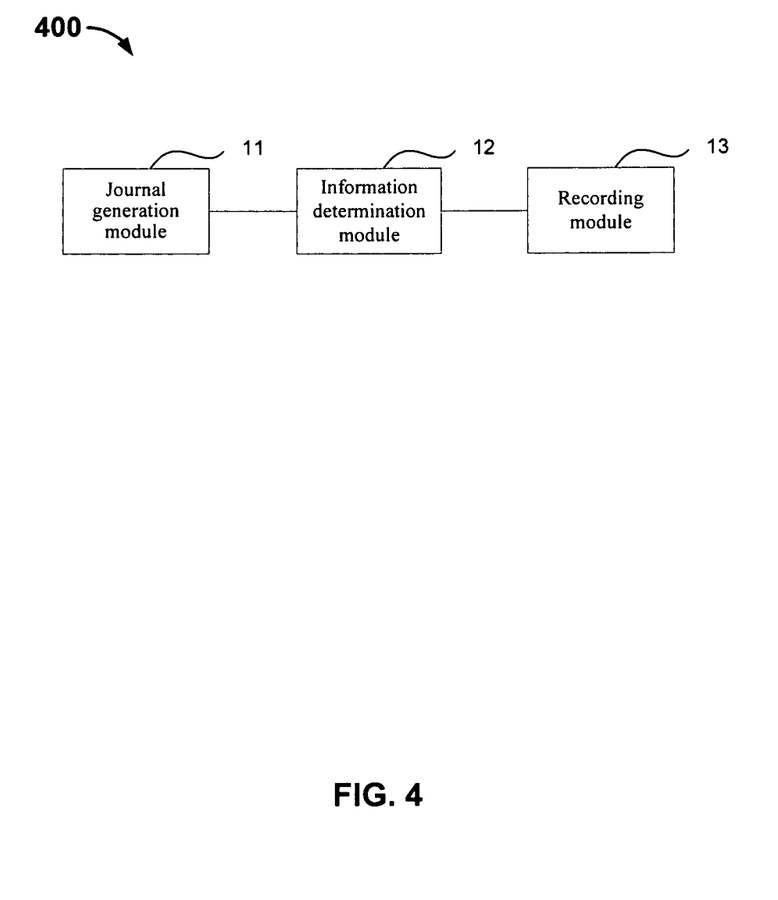
FIG. 4 is a diagram showing an embodiment of a system of managing user accesses.

FIG. 4 is a diagram showing an embodiment of a system of managing user accesses. As shown in the example, system 400 includes journal generation module 11, information determination module 12 and recording module 13. In some embodiments, process 200 can be implemented using system 400.

The modules can be implemented as software components executing on one or more processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices.

Journal generation module 11 is configured to generate journal files in response to receiving information regarding user accesses of a webpage (e.g., associated with an electronic commerce website), including merchandise information. In some embodiments, a journal file includes information regarding at least one attribute of the merchandise information that is displayed or otherwise presented at the accessed webpage.

Information determination module 12 is configured to determine the one or more categories associated with a generated journal file. In some embodiments, information determination module 12 is configured to determine the corresponding attribute information (e.g., using the generated journal files) for each determined merchandise category. In some embodiments, information determination module 12 is also configured to determine a quantity corresponding to each piece of attribute information for each merchandise category. For example, the quantity corresponding to a piece of attribute information, such as brand information for the merchandise category of cell phones, can be determined based on the number of times of that brand information appeared among journal files that are associated with the category of cell phones. In some embodiments, there is more than one type under each piece of attribute information and a quantity is determined for each type. For example, for the merchandise category of cell phones and the attribute information of brand information, there could be two types of brands of cell phones, "Google™ Android™" and "Apple® iPhone®." In this example, if "Google™ Android™" appears 38 times among the analyzed journal files, then 38 is the quantity that corresponds to the "Google™ Android™" type of brand attribute information for the category of cell phones.

Recording module 13 is configured to record and store a model information group for each merchandise category. In some embodiments, model information group is stored in a database. In various embodiments, a model information group for a merchandise category includes at least the attribute information (e.g., brand, model, and color) corresponding to the merchandise category and quantities associated with each piece of attribute information. In some embodiments, a piece of attribute information for a particular category includes multiple types and so the stored model information group for cell phones includes an identifier for each type and also an associated quantity. For example, for the merchandise category of cell phones and the attribute information of brand information, there could be two types of brands of cell phones, "Google™ Android™" and "Apple® iPhone®." In this example, if "Google™ Android™" appears 38 times among the analyzed journal files, then 38 is the quantity that corresponds to the "Google™ Android™" type of brand attribute information for the model information group for the category of cell phones.

Figure 5:
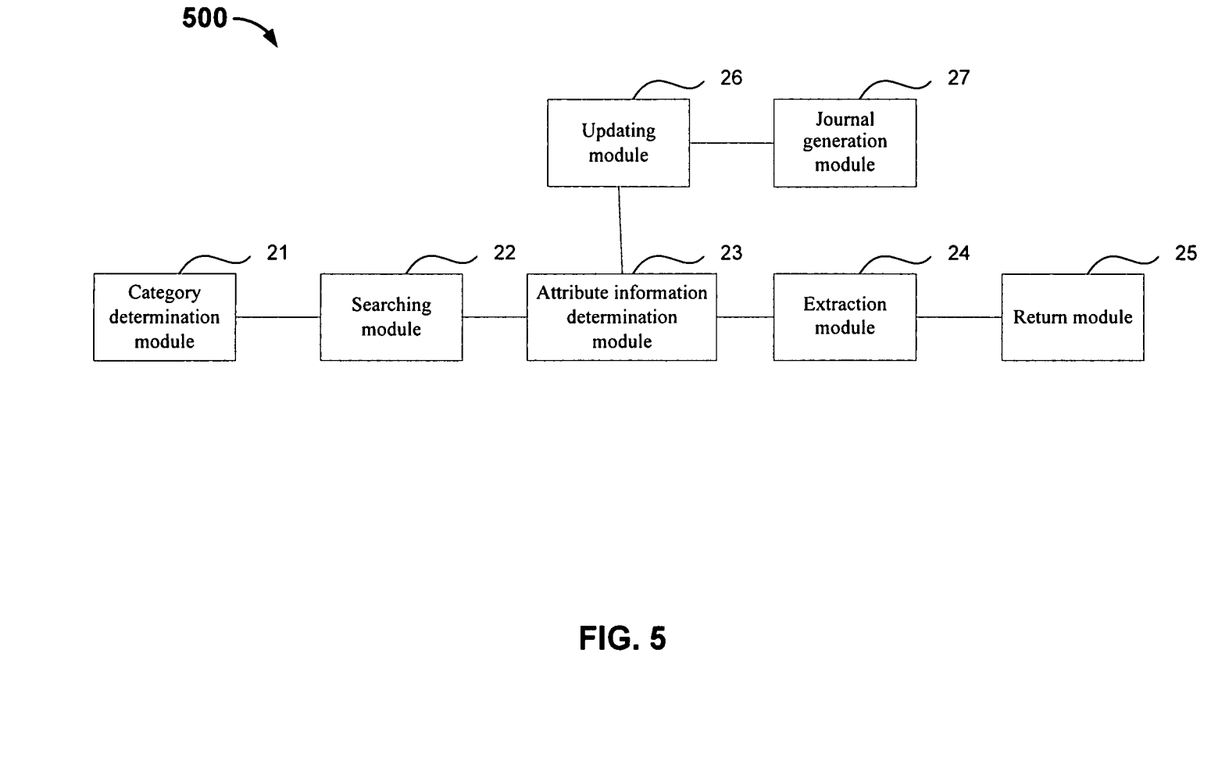
FIG. 5 is a diagram showing an embodiment of a system of using recorded user accesses.

FIG. 5 is a diagram showing an embodiment of a system of using recorded user accesses. As shown in the example, system 500 includes category determination module 21, search module 22, attribute information determination module 23, extraction module 24 and return module 25. In some embodiments, process 300 can be implemented using system 500.

Category determination module 21 is configured to determine the merchandise category with which a query is associated based on the keywords of the query. In some embodiments, the query is inputted by a user at an electronic commerce website with the intent to search for merchandise information at the website.

Search module 22 is configured to retrieve the model information group corresponding to the determined merchandise category. In some embodiments, the model information group is retrieved from the database for storing model information groups.

Attribute information determination module 23 is configured to determine whether the attribute information of the retrieved model information group matches any of the keywords of the query.

Extraction module 24 is configured to extract attribute information of the retrieved model information group. In some embodiments, the type associated with each piece of attribute information that has the greatest corresponding quantity is extracted. In some embodiments, attribute information and types thereof, whose quantity exceeds a certain threshold are extracted.

Return module 25 is configured to present the extracted information.

Search module 22 is configured to match the keywords with attribute information of one or more model information groups.

Attribute information determination module 23 is configured to eliminate one or more keywords of the query for which matches to attribute information of model information groups are not found. After these keywords are eliminated, attribute information determination module 23 is also configured to match the remaining keywords with attribute information from one or more model information groups.

Updating module 26 is configured to update the retrieved model information group based on the keywords of the query, based on the elimination of a keyword from the query. Updating module 26 is configured to update one or more model information groups based on newly generated journal files.

Return module 25 is configured to present attribute information. In some embodiments, when no model information group is retrieved (e.g., because no match exists between the keywords of the query and a model information group), attribute information is extracted from a merchandise category tree. Nodes of the merchandise category tree that include information that matches the one or more keywords of the query are returned to the user, in the form of URLs to webpages, including the extracted information or as a display/presentation of the extracted information.

Journal generation module 27 is configured to generate journal files to include the information returned from return module 25.

In some embodiments, systems 200 and 300 can be implemented as one system.

The embodiments of the present application can be provided as methods, systems or computer program products. Therefore, the present application can employ forms that are entirely hardware embodiments, entirely software embodiments or embodiments that integrate the software and hardware aspects. Moreover, the present application can employ forms that implement computer program products in one or more storage media (including but not limited to magnetic disk storage devices, CD-ROM, optical storage devices, etc.) that include program codes that computers can use.

The present application was described in reference to flowcharts and/or block diagrams of methods, equipment (systems) and computer program products based on the embodiments of the present application. It should be understood that computer commands can be used to achieve each of the flow procedures and/or blocks in the flowcharts and/or block diagrams and combinations of the flow procedures and/or blocks in the flowcharts and block diagrams. The processors that can provide these computer program commands to general-purpose computers, special-purpose computers, embedded or processing machines and other programmable data processing equipment can be produced as a single machine, causing the commands for execution via the processors of computers or other programmable data processing equipment to be produced for use in devices that achieve the designated functions in flowcharts of one flow procedure or multiple flow procedures and/or one block or multiple blocks of a block diagram.

In some embodiments, these computer program commands can also be stored in computer-readable storage devices working in specific modes that can guide computers or other programmable data processing equipment, causing the commands stored in these computer-readable storage devices to comprise manufactured products of the command devices, said command devices achieving the designated functions in one flow procedure or multiple flow procedures of a flowchart and/or one block or multiple blocks of a block diagram.

These computer program commands can also be loaded into computers or other programmable data processing equipment, causing a series of operational steps to be executed in these computers or other programmable equipment that produce computers that achieve the processing. The commands thereby executed in computers or other programmable equipment, providing the steps used to achieve the designated functions in one flow procedure or multiple flow procedures of a flowchart and/or one block or multiple blocks of a block diagram.

Although some embodiments of the present application have been described, once technical personnel in this field become aware of the basic innovative concepts, additional modifications or revisions can be made to these embodiments. Therefore, the attached claims are intended to be understood as comprising as only some embodiments and all modifications and revisions of such embodiments falling within the scope of the present application.

Obviously, technical personnel in this field can make various changes and modifications to the present application without departing from the spirit and the scope of the present application. In this manner, should these revisions and modifications to the present application fall within the scope of the claims of the present application and its equivalent technologies, then the present application also intends to include these changes and modifications.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing user accesses of merchandise information, comprising:
    generating journal files over a predetermined period of time, wherein a journal file includes merchandise information associated with an accessed webpage;
    determining, for a merchandise category, information related to an attribute associated with the merchandise category based at least in part on the generated journal files, wherein the information related to an attribute includes at least a first type associated with the attribute;
    aggregating information associated with the attribute from journal files associated with the merchandise category, wherein aggregating information includes generating a quantity associated with the first type associated with the attribute based at least in part on a number of times the first type associated with the attribute appears in the journal files, wherein the aggregated information is to be included in a model information group associated with the merchandise category; and
    performing a subsequent search of merchandise information using information associated with the model information group, wherein performing the subsequent search includes determining whether a matching merchandise category can be found in response to a query keyword associated with the subsequent search; in the event that the matching merchandise category can be found, extracting attribute information from the model information group associated with the merchandise category; in the event that the matching merchandise category cannot be found, searching a merchandise category tree using the query keyword and returning information from one or more matching nodes of the merchandise category tree.

2. The method of claim 1, wherein information related to an attribute includes one or more of the following: merchandise brand information, merchandise model number information, merchandise color information, and merchandise category information.

3. A method for conducting searches of merchandise information, comprising:
    determining whether a matching merchandise category can be found in response to a query based at least in part on received keywords associated with the query;
    in the event that the matching merchandise category can be found:
        retrieving a model information group corresponding to the determined matching merchandise category;
        extracting attribute information from the retrieved model information group based at least in part on a quantity associated with an attribute, wherein the attribute includes at least a first type associated with the attribute and wherein the quantity associated with the attribute is based at least in part on a number of times the first type associated with the attribute appears in a set of generated journal files; and
        presenting the extracted attribute information from the retrieved model information group;
    in the event that the matching merchandise category cannot be found, searching a merchandise category tree using the received keywords and returning information from one or more matching nodes of the merchandise category tree.

4. The method of claim 3, wherein extracting attribute information includes extracting attribute information whose corresponding quantity exceeds a predetermined threshold.

5. The method of claim 3, wherein extracting attribute information includes extracting attribute information whose corresponding quantity is the greatest among a plurality of types associated with the attribute.

6. The method of claim 3, further comprising identifying attribute information of the retrieved model information group that matches a keyword associated with the query.

7. The method of claim 6, further comprising determining in the event that a keyword associated with the query does not match attribute information of the retrieved model information group, eliminating the keyword from the query.

8. The method of claim 7, further comprising updating the retrieved model information group using keywords associated with the query that are not eliminated.

9. The method of claim 3, further comprising updating journal files based at least in part on the information returned from the one or more matching nodes of the merchandise category tree.

10. A system for conducting searches of merchandise information, comprising:
    a processor configured to:
        determine whether a matching merchandise category can be found in response to a query based at least in part on received keywords associated with the query;

in the event that the matching merchandise category can be found:
  retrieve a model information group corresponding to the determined matching merchandise category;
  extract attribute information from the retrieved model information group based at least in part on a quantity associated with an attribute, wherein the attribute includes at least a first type associated with the attribute and wherein the quantity associated with the attribute is based at least in part on a number of times the first type associated with the attribute appears in a set of generated journal files; and
  present the extracted attribute information from the retrieved model information group;
in the event that the matching merchandise category cannot be found, search a merchandise category tree using the received keywords and return information from one or more matching nodes of the merchandise category tree; and
a memory coupled to the processor and configured to provide the processor with instructions.

11. The system of claim 10, wherein the processor configured to extract attribute information includes extracting attribute information whose corresponding quantity exceeds a predetermined threshold.

12. The system of claim 10, wherein the processor configured to extract attribute information includes extracting attribute information whose corresponding quantity is the greatest among a plurality of types associated with the attribute.

13. The system of claim 10, further comprising the processor configured to identify attribute information of the retrieved model information group that matches a keyword associated with the query.

14. The system of claim 13, further comprising the processor configured to determine in the event that a keyword associated with the query does not match attribute information of the retrieved model information group, to eliminate the keyword from the query.

15. The system of claim 14, further comprising the processor configured to update the retrieved model information group using keywords associated with the query that are not eliminated.

16. The system of claim 10, further comprising the processor configured to update journal files based at least in part on the information returned from the one or more matching nodes of the merchandise category tree.

17. A computer program product for conducting searches of merchandise information, the computer program product being embodied in a computer readable storage medium and comprising computer instructions for:
  determining whether a matching merchandise category can be found in response to a query based at least in part on received keywords associated with the query;
  in the event that the matching merchandise category can be found:
    retrieving a model information group corresponding to the determined matching merchandise category;
    extracting attribute information from the retrieved model information group based at least in part on a quantity associated with an attribute, wherein the attribute includes at least a first type associated with the attribute and wherein the quantity associated with the attribute is based at least in part on a number of times the first type associated with the attribute appears in a set of generated journal files; and
    presenting the extracted attribute information from the retrieved model information group;
  in the event that the matching merchandise category cannot be found, searching a merchandise category tree using the received keywords and returning information from one or more matching nodes of the merchandise category tree.

* * * * *